United States Patent
Ruegg et al.

(10) Patent No.: US 7,555,228 B2
(45) Date of Patent: Jun. 30, 2009

(54) METHOD AND SYSTEM FOR FACILITATING BURST-MODE OPTICAL POWER MEASUREMENT

(75) Inventors: Eugen H. Ruegg, Cary, NC (US); Richard C. Stamey, Hillsboro, OR (US); Jason T. Teeter, Apex, NC (US)

(73) Assignee: Alcatel Lucent, Paris (FR)

(*) Notice: Subject to any disclaimer, the term of this patent is extended or adjusted under 35 U.S.C. 154(b) by 613 days.

(21) Appl. No.: 11/189,291

(22) Filed: Jul. 26, 2005

(65) Prior Publication Data
US 2007/0023615 A1    Feb. 1, 2007

(51) Int. Cl.
*H04B 10/06* (2006.01)
(52) U.S. Cl. .............. 398/209; 398/202; 398/208; 398/72
(58) Field of Classification Search ............ 398/38, 398/72, 168, 63, 209, 202, 171, 94, 208; 330/288; 250/214 R
See application file for complete search history.

(56) References Cited

U.S. PATENT DOCUMENTS 6,476,954 B1 * 11/2002 Nishizono .............. 398/202
6,919,716 B1 * 7/2005 Buehler .................. 324/96
7,155,133 B2 * 12/2006 Stewart et al. ........... 398/202
7,212,798 B1 * 5/2007 Adams et al. ............ 455/251.1

* cited by examiner

*Primary Examiner*—Ken N Vanderpuye
*Assistant Examiner*—Hibret A Woldekidan

(57) ABSTRACT

An optical line termination comprises a DC current load, power measurement circuitry, upstream data path circuitry and current mirror circuitry. The current mirror circuitry is connected between the DC current load, the power measurement circuitry and the upstream data path circuitry. The DC current load is connected in parallel with a photodiode of the upstream data path circuitry. The DC current load exhibits a substantially fixed load. The current mirror provides a copy of an aggregate current to the power measurement circuitry. The aggregate current is a summation of a current draw by the DC current load and a current draw by the photodiode. The power measurement circuitry is configured for outputting a power level dependent upon the aggregate current. Accordingly, the optical line termination provides for a non-intrusive solution for measuring optical input power and, thereby, enables the measured optical power to be monitored.

13 Claims, 3 Drawing Sheets

METHOD AND SYSTEM FOR FACILITATING BURST-MODE OPTICAL POWER MEASUREMENT

FIELD OF THE DISCLOSURE

The disclosures made herein relate generally to optical power measurement in a passive optical network and, more particularly, to techniques for facilitating burst-mode optical power measurement.

BACKGROUND

Conventional optical input power measurement solutions for optical data networks consist of average current-to-voltage conversion performed by a trans-impedance amplifier (TIA) or limiting amplifier (LimAmp). The TIA or LimAmp is provided in a receive data path of the optical data network. In the case of a Passive Optical network (PON), a primary function of use of one of these devices in an Optical Line Termination (OLT) application is to convert high-frequency photodiode current to digital voltage levels for data recovery. In some cases the TIA or LimAmp also provides an output voltage proportional to average optical input power, which is used by an external circuit to generate a Received Signal Strength Indication (RSSI) measurement.

Known optical network technologies such as BPON (i.e., Broadband Passive Optical Network) and GPON (i.e., Gigabit Passive Optical Network) use burst-mode transmission at relatively high bit rates. Accordingly, BPON and GPON are referred to herein as burst-mode enabled PON technologies. Facilitating input power measurement for burst-mode enabled PON technologies requires implementing functionality in a network's Media Access Controller (MAC) to coordinate Optical Network Unit (ONU) burst with the RSSI measurement. However, to date, no solutions for MAC-layer functions required for facilitating such conventional optical input power measurements are known to exist. One example of such MAC-layer functionality is facilitating control of an Analog-to-Digital Converter (ADC) for converting analog signalling information to corresponding digital signalling information.

Without imposing significant added cost and complexity, conventional optical input power measurement solutions will exhibit one or more limitations when implemented in relatively high bit rate applications such as GPON. One limitation is the response time for facilitating such measurements when using conventional optical input power measurement solutions. It is typically in excess of 1 millisecond. In a burst-mode system such as a GPON, where a timeslot on the shared medium (typically microseconds) must be allocated for the measurement, the time taken to measure power from one ONU affects the ability of the system to meet quality-of-service requirements for other end users. Accordingly, in a GPON system, a response time on the order of milliseconds is considered unacceptable. Another limitation is the dynamic range associated with such measurements. It is limited by the use of a voltage output that varies linearly with average photodiode current, which results in voltage output on the order of volts at the high end of the input power range and millivolts at the low end of the input power range. In the case where this output voltage is referenced to ground potential, great care is required in the circuit implementation to overcome effects such as noise and offset voltages. An ADC utilized in facilitating measure of the input voltage is required to have relatively high resolution in order to meet the accuracy requirement at low power levels. This resolution requirement contributes to increased cost as well as longer conversion time. Additionally, TIA transimpedance, which determines the current-to-voltage gain and therefore affects accuracy, tends to vary significantly over temperature and device lot. Still another limitation is that accuracy is less than acceptable. Conventional optical input power measurement solutions that utilize linear current-to-voltage conversion require calculation of a logarithmic function to convert voltage to optical power in units of dBm. Such a calculation or table look-up on an OLT will contribute additional error due to limited processing power and/or memory of the OLT. One further limitation is that RSSI measurement solutions that are built into a TIA or other data path devices have the effect of limiting which devices can be used in the data path.

Therefore, facilitating optical input power measurement in a manner that at least partially overcomes limitations associated with conventional approaches for facilitating optical input power measurement would be useful and advantageous.

SUMMARY OF THE DISCLOSURE

The present invention provides for a non-intrusive solution for measuring optical input power and, thereby, enables the measured optical power to be monitored. In doing so, the present invention enables optical system equipment to adjust system parameters during normal operation in order to improve system performance dependent upon the measured optical input power. For example, optical network technologies that utilize burst-mode transmission at relatively high bit rates (e.g., GPON and BPON) are particularly well-suited for and benefit from implementing such a non-intrusive measuring solution because information derived from the optical input power measurements can be used to reduce the performance requirements of optical interfaces of an associated passive optical network, thus supporting improvements in system performance. Additionally, facilitating optical input power measurements in accordance with the present invention offers faster response, greater dynamic range and greater accuracy than that offered by conventional measurement solutions, which is mandatory for adjusting system parameters dependent upon optical input power measurements in sophisticated, high-bandwidth optical network technologies such as GPON and BPON.

In one embodiment of the present invention, an optical line termination comprises a DC current load, power measurement circuitry, upstream data path circuitry and current mirror circuitry. The current mirror circuitry is connected between the DC current load, the power measurement circuitry and the upstream data path circuitry.

In another embodiment of the present invention, an optical input power monitoring apparatus comprises current mirror circuitry and power measurement circuitry. The current mirror circuitry includes a first output and a second output. The power measurement circuitry is connected to the second output. The current mirror circuitry is configured for producing a copy of a first current, for outputting the copy of the first current through the second output and for outputting the first current through the first output.

In another embodiment of the present invention, a method is configured for generating a received signal strength indication. An operation is performed for providing a copy of an aggregate current. The aggregate current is a summation of a current draw by a DC current load and a current draw by a photodiode of upstream data path circuitry in a passive optical network. After providing the copy of the aggregate current, an operation is performed for converting the aggregate current to a digital voltage, followed by an operation being performed for converting the digital voltage to a power level.

Turning now to specific aspects of the present invention, in at least one embodiment, the DC current load is connected in parallel with a photodiode of the upstream data path circuitry.

In at least one embodiment of the present invention, the DC current load exhibits a substantially fixed load.

In at least one embodiment of the present invention, the current mirror provides a copy of an aggregate current to the power measurement circuitry, and the aggregate current is a summation of a current draw by the DC current load and a current draw by the photodiode.

In at least one embodiment of the present invention, the power measurement circuitry includes analog amplification circuitry and analog-to-digital converting circuitry, the analog amplification circuitry is connected between the current mirror circuitry and the analog-to-digital converting circuitry, the current mirror circuitry provides a copy of an aggregate current to the analog amplification circuitry, and the aggregate current is a summation of a current draw by the DC current load and a current draw by a photodiode of the upstream data path circuitry.

In at least one embodiment of the present invention, the power measurement circuitry includes a first analog filter connected between the current mirror circuitry and the analog amplification circuitry, and a second analog filter connected between the analog amplification circuitry and the analog-to-digital converting circuitry.

In at least one embodiment of the present invention, the analog amplification circuitry outputs an analog voltage dependent upon the aggregate current; the analog-to-digital converting circuitry outputs a digital voltage dependent upon the analog voltage, and the power measurement circuitry includes a power measurement module that outputs a power level dependent upon the digital voltage.

In at least one embodiment of the present invention, the power measurement circuitry include a counter and the power measurement circuitry is configured for starting the counter in response to an expected change in at least one of the analog current and the analog voltage and for initiating an analog-to-digital conversion of the analog voltage when the counter attains a prescribed number of counts.

In at least one embodiment of the present invention, an operation for providing a copy of the aggregate current includes providing to current mirror circuitry both a current draw by a DC current load and a current draw by a photodiode of upstream data path circuitry.

In at least one embodiment of the present invention, converting the aggregate current to the digital voltage includes providing the aggregate current to analog amplification circuitry for generating an analog voltage dependent upon the aggregate voltage and providing the analog voltage to analog-to-digital converting circuitry for generating a digital voltage dependent upon the analog voltage.

In at least one embodiment of the present invention, converting the digital voltage to the power level includes providing the digital voltage to a power measurement module for generating a power level dependent upon the digital voltage.

In at least one embodiment of the present invention, converting the analog voltage to the digital voltage include starting a counter in response to energizing the photodiode and initiating an analog-to-digital conversion of the analog voltage when the counter attains a prescribed number of counts.

In at least one embodiment of the present invention, the converting the digital voltage to the power level is performed in response to completion of the converting the aggregate voltage to the digital voltage.

These and other objects, embodiments advantages and/or distinctions of the present invention will become readily apparent upon further review of the following specification, associated drawings and appended claims.

DETAILED DESCRIPTION OF THE DRAWING FIGURES

Figure 1:
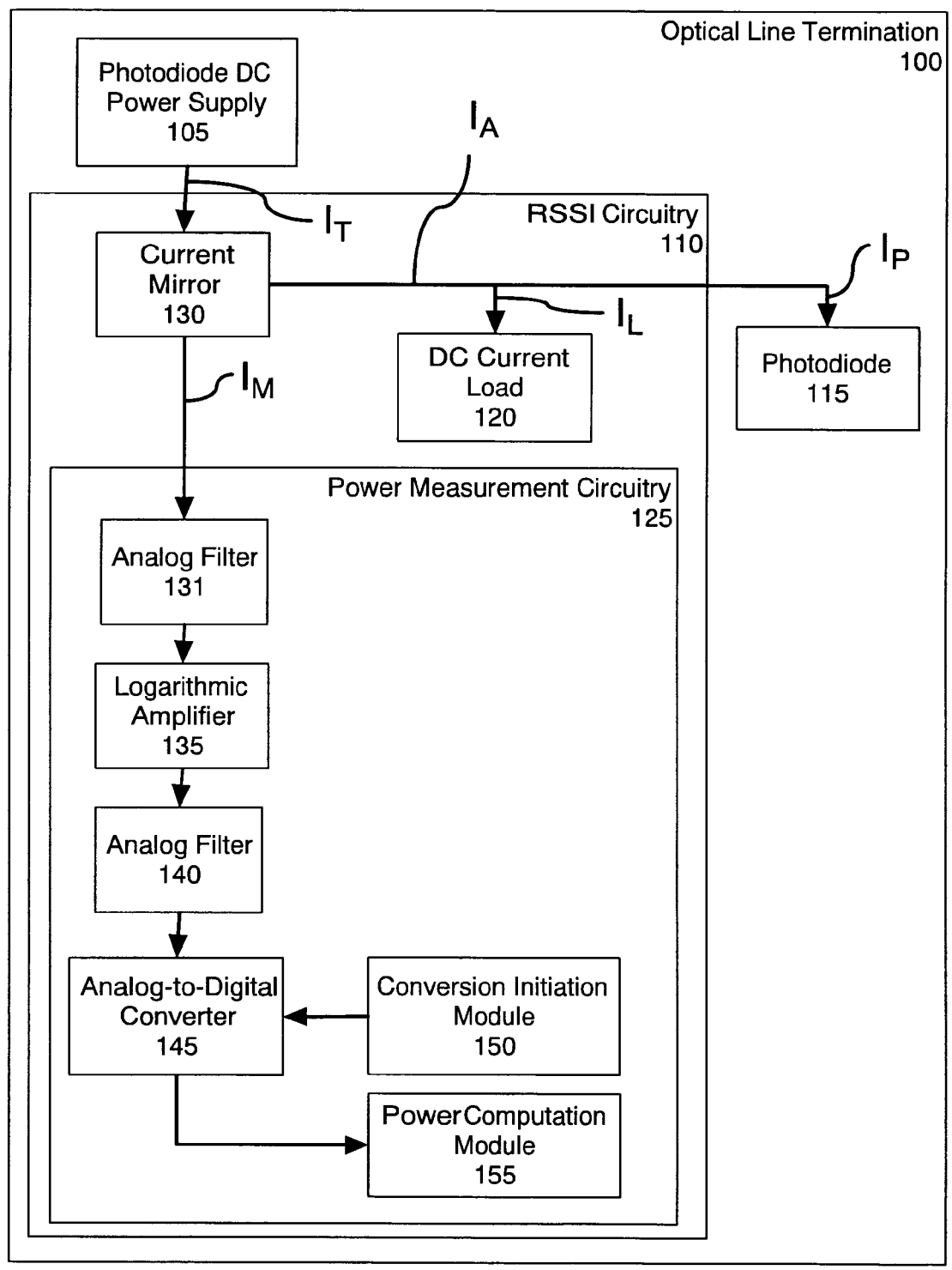
FIG. 1 depicts an embodiment of an optical line termination including received signal strength indication circuitry in accordance with the present invention.

In a Passive Optical Network (PON), each Optical Line Termination (OLT) is connected over an optical fiber plant to several Optical Network Units (ONUs). The OLT is a unit typically located at a service provider premise and the each ONU is located at or near a subscriber premise. The ONUs take turns transmitting data to the OLT. Due to differences in output calibration, fiber loss, etc. an OLT can see a relatively strong optical signal from one ONU and a relatively weak signal from another ONU. This variance in received optical signal strength can make it difficult (and expensive) for an OLT to correctly recover input data.

To reduce adverse effects associated with such variations in signal strength, it is advantageous to implement a power levelling mechanism for reducing the range of input optical power seen at the receiver of the OLT. The power levelling mechanism sends messages to the ONUs that cause them to adjust their output power. However, the OLT must know with some degree of accuracy what power level it receives from each ONU in order to make the decision as to how the ONU output power should be adjusted. Current OLT receiver technology does not provide this measurement as a standard feature, therefore requiring separate received signal strength indication (RSSI) circuitry to be implemented. OLT's in accordance with the present invention include such RSSI circuitry and, thereby, support such power levelling functionality.

In addition to the requirements for power levelling, it is desirable that an OLT be able to provide input power values in units of dBm on a per-ONU basis for the purpose of non-intrusive monitoring of system conditions by a system operator (e.g., systems performance monitoring or periodic maintenance). Accordingly, optical input power measurements facilitated in accordance with the present invention may be used to meet the power levelling recommendation and can serve this purpose as well.

Gigabit PON (GPON), which is defined in ITU-T Recommendation G.984, is a specific example of a PON technology into which an OLT in accordance with the present invention may be implemented for the purpose of enabling power levelling functionality. However, it is disclosed herein that power levelling and the corresponding benefit of RSSI circuitry in accordance with the present invention will be applicable to other optical network technologies and, perhaps, other applications in general.

The GPON Physical Medium Dependent (PMD) layer specification (i.e., in ITU-T Recommendation G.984.2, 03/2003) describes a power levelling mechanism that can be implemented on an OLT in order to relax dynamic range requirement for the OLT burst-mode receiver. The specification includes a number of specific recommendations for such a mechanism. A first specific recommendation is that the OLT measures the average optical input power (P) of each ONU burst. This constrains the response time of the measurement technique because the measurement must be performed during normal operation of the PON. The OLT controls the burst time allocated for each ONU so the ONU burst time can vary. Typical burst times are expected to be on the order of microseconds. Larger burst times can be allocated by the OLT, but will tend to add latency to traffic from other ONUs. A second specific recommendation is that the OLT Rx must be able to measure the burst power at 5 dB below sensitivity (as defined by ITU G.984). This recommendation serves to define the dynamic range of the measurement technique. The Rx sensitivity requirement is on the order of −30 dBm (dB milliwatts) and the upper end of the input power range could approach −5 dBm. This results in a dynamic range of 30 dB for optical input power or 60 dB for the electrical current output of a photodiode of the OLT. A third specific recommendation is that the uncertainty range of the measurement over the full operating range of the OLT is 4 dB maximum. This defines the error tolerance of the measurement over the operating range of the OLT, including variations in temperature and input power level. Power measurement functionality in accordance with the present invention provides a means for accommodating these recommendations.

In addition to the requirements for power levelling, it is desirable that the GPON OLT be able to provide input power values in units of dBm on a per-ONU basis for the purpose of non-intrusive monitoring of system conditions by a system operator (Systems Performance Monitoring or PM). The measurements used to meet the power levelling recommendation serve this purpose.

FIG. 1 depicts an embodiment of an optical line termination in accordance with the present invention, which is referred to herein as the optical line termination (OLT) 100. The optical line termination 100 comprises a photodiode DC power supply 105, received signal strength indication (RSSI) circuitry 110 and a photodiode 115. The RSSI circuitry 110 is connected between the photodiode DC power supply 105 and the photodiode 115. The DC power supply 105 provides input power current to the photodiode 115 during signalling operation of the photodiode 115. The photodiode DC power supply 105 and the photodiode 115 are conventional OLT components and, thus, will not be discussed in significantly greater detail herein.

The RSSI circuitry 110 includes a DC current load 120, power measurement circuitry 125 and current mirror circuitry 130. The DC current load 120 is connected in parallel with the photodiode 115, which contributes to reducing overall response time of the RSSI circuitry 110. The current mirror circuitry 130 is connected between the DC current load 120, the DC power supply 105 and the power measurement circuitry 125. As with current flow in conventional photodiode OLT implementations, an optical input signal results in the photodiode DC power supply 105 providing electrical current to the photodiode 115 (i.e., photodiode current $I_P$). However, in accordance with the present invention, parallel connection of the photodiode 115 with the DC current load 120 results in the photodiode DC power supply 105 providing electrical current to the DC current load 120 (i.e., DC load current $I_L$). Together, the photodiode current $I_P$ and the DC load current $I_L$ represent an aggregate current (i.e., aggregate current $I_A$). Preferably, the DC current load 120 implements temperature compensation techniques to provide an offset current that varies little with temperature.

The current mirror circuitry 130 provides a copy of the aggregate current $I_A$ to the power measurement circuitry 125 (i.e., mirror current $I_M$), which enables measurement of the photodiode current $I_P$ to be performed without regard to the data path implementation. Advantageously, measurement of the photodiode current $I_P$ in accordance with the present invention is independent of data path components (and vice-versa) so that improvements to either the RSSI circuit or data path circuit can be implemented without affecting one another.

Preferably, the DC current load 120 exhibits a substantially fixed load and, accordingly, draws a known current (i.e., the DC load current $I_L$) such that the mirror current $I_M$ has a known relationship to the photodiode current $I_P$ and can be measured without affecting receiver circuitry of the OLT. The photodiode DC power supply 105, the photodiode 115 and other conventional circuitry of the OLT 100 that receives ONU signals and transmits them upstream are examples of the receiver circuitry. The current mirror 130 advantageously serves to isolate receiver circuit of the OLT 100 from the power measurement circuitry 125, which is advantageous because location of the photodiode circuit 115 in the OLT 100 is very sensitive to noise contamination.

The power measurement circuitry 125 includes a first analog filter 131, a logarithmic amplifier 135, a second analog filter 140, an analog-to-digital converter 145, a conversion initiation module 150 and a power computation module 155. The logarithmic amplifier 135 is connected between the first analog filter 131 and the second analog filter 140. The second analog filter 140 is connected between the logarithmic amplifier 135 and the analog-to-digital converter 145. The conversion initiation module 150 and a power computation module 155 are each connected to the analog-to-digital converter 145.

As disclosed above, the current mirror circuitry 130 provides a copy of the aggregate current $I_A$ to the power measurement circuitry 125 (i.e., mirror current $I_M$). The mirror current $I_M$ is in an analog form. Preferably, but not necessarily, the mirror current $I_M$ includes gain (i.e., $I_M$=Gain*$I_P$+$I_L$). The mirror current $I_M$ is provided from the current mirror circuitry 130 (i.e., via a mirror current output) to an input of the logarithmic amplifier 135 through the first analog filter 131. The first analog filter 131 provides for frequency compensation and noise rejection to the mirror current $I_M$. The logarithmic amplifier 135 outputs an analog voltage dependent upon an average of the mirror current $I_M$ (i.e., converts the mirror current $I_M$). The average of the mirror current $I_M$ is converted to the analog voltage on a logarithmic scale, which increases dynamic range and simplifies calculation of photodiode input power in units of dBm. For example, a 1 μA mirror current $I_M$ corresponds to a 0.2V analog voltage while a 10 μA mirror current $I_M$ corresponds to a 0.4V analog voltage, a 100 μA mirror current $I_M$ corresponds to a 0.6V analog voltage, etc. Advantageously, the conversion of the mirror current $I_M$ on a logarithmic scale improves dynamic range by converting a wide range of input power levels to a voltage range that is suitable for measurement by a relatively low-cost analog-to-digital converter in a typical central office environment (i.e. in the presence of noise from local switching power supplies and other electronics).

The logarithmic amplifier 135 largely influences the response time of the RSSI circuitry 110. The response time of known integrated logarithmic amplifiers (e.g., the logarithmic amplifier 135) varies in proportion to an applied input current (i.e., the mirror current $I_M$). When initial input power (i.e., derived from the mirror current $I_M$) is very low, the response time for the logarithmic amplifier 135 can be unacceptably large. For example, response time for a typical logarithmic amplifier is several hundred microseconds when starting at zero input power and going to a very low average input power. Response times greater than about 100 microseconds can place unacceptable constraints on upstream ONU bandwidth allocation. Accordingly, the DC current load 120 is advantageously connected in parallel with the photodiode 115 (i.e., a shunt load) to improve overall response time. Inclusion of the DC current load 120 serves to sink a constant amount of current so that the input of the logarithmic amplifier 135 exhibits input current offset. The sink current generated by the DC current load 120 is sufficiently large to move the logarithmic amplifier 135 into an operating region where the response time for any valid input is acceptable. For example, a sink current of 1 microamp may result in a maximum response time of up to about 50 microseconds. The sink current has the effect of raising the offset voltage at the logarithmic amplifier 135 output, but does not affect its logarithmic gain.

The analog voltage outputted by the logarithmic amplifier 135 is provided to an input of the analog-to-digital converter 145 (i.e., an analog-to-digital converter input) through the second analog filter 140. The second analog filter 140 provides for frequency compensation and noise rejection to the analog voltage. The analog-to-digital converter 145 outputs a digital voltage dependent upon the analog voltage (i.e., converts the analog voltage).

The analog voltage outputted from the logarithmic amplifier 135 is continually provided to the analog-to-digital converter 145. In accordance with the present invention, the conversion initiation module 150 initiates analog-to-digital conversions for facilitating a power computation corresponding to a specific photodiode burst. It is disclosed herein that the power computation for a specific photodiode burst power computation may be triggered either local to the OLT or from a higher level of the system. For example, the conversion initiation module 150 and the power computation module 155 may be components of a GPON MAC interface through which power computation may be triggered. In this example, the MAC Interface allocates an upstream timeslot for a particular optical network unit (ONU) to be measured and knows (e.g., per standard GPON operation) when the ONU burst starts. MAC control of the analog-to-digital conversions contributes to tight coordination of photodiode input power measurements with respect to ONU bursts. When the upstream burst starts (i.e., is energized), the MAC interface starts a counter of the conversion initiation module 150 whose terminal value has been set based on the system configuration. Preferably, the terminal value represents the settling time of the RSSI circuitry 110 plus some margin. When the counter reaches its terminal value, the conversion initiation module 150 triggers an analog-to-digital conversion of the analog voltage. In this manner, response time of the RSSI circuitry 110 is consistent with a single ONU burst so that input power measurements can be made during normal operation of the photodiode 115 with reduced impact on signalling traffic.

When the analog-to-digital conversion is complete, the analog-to-digital converter 145 triggers the power computation module for facilitating computation of photodiode input power in dBm dependent upon the digital voltage outputted by the analog-to-digital converter. In one embodiment of the present invention, the conversion of digital voltage to photodiode input power ($P_{in}$) in dBm is defined by a calculation of the form:

$$P_{in}(dBm) = A \times V_{out} + B + f(V_{out}),$$

where A and B are constants and $f(V_{out})$ is a function of $V_{out}$ which accounts for the offset current from the photodiode and DC current sink when there is zero optical input. Preferably, the values of A, B and $f(V_{out})$ are calculated and stored when the OLT 100 is calibrated so that only arithmetic operations (e.g., multiplication and addition operations) need be performed at run-time.

In an alternate embodiment of the present invention, a resistor or other linear conversion circuit is used instead of a logarithmic amplifier to convert current to voltage. In this case, the DC current load is not required to improve the overall response time. However, the DC current load still provides benefits associated with moving the analog-to-digital converter input away from 0V at low input power levels. Such an alternate embodiment may potentially exhibit some of the same issues as the known existing input power measurement solutions with respect to dynamic range and accuracy. Advantageously, however, this alternate embodiment of the present invention provides a means of measuring optical input power for each ONU during normal operation that is independent of the data path components and that has minimal impact on signalling traffic.

Turning now to a discussion of a specific utility for input power measurement functionality in accordance with the present invention, the burst-mode receiver circuitry on a typical OLT in a PON is typically designed to support a specific optical power range (e.g. −27 dBm to −6 dBm), which is based on network parameters such as bit rate and Optical Distribution Network (ODN) class. Existing PON systems use open-loop techniques to set the receiver operating point with respect to measured input power from each ONU and only account for conditions at the OLT (such as temperature) and not conditions on the PON. However, in a system in accordance with the present invention where the input power from each Optical Network Unit (ONU) can be measured and the input optical-to-electrical gain can be adjusted, the input range of the OLT can be inventively controlled in closed-loop fashion to account for different optical network level conditions. Advantageously, this capability can extend the operating range by as much as an additional 6 dBm (e.g. −30 dBm to −3 dBm).

PON technologies such as GPON (i.e., defined in ITU Recommendation G.984) require that the OLT receiver circuitry support a wide dynamic range of burst-mode optical input power levels from multiple Optical Network Units (ONU). This is typically accomplished by optimizing the receiver operating point at some initial condition such that system requirements are met over operating conditions such as temperature and aging. As discussed above, the GPON standard describes a power levelling mechanism enabling ONU output power levels to be grouped. Thus, power levelling can be used to reduce the dynamic range requirement of the OLT receiver by about 6 dB. But, undesirably, conventional approaches for facilitating ONU power adjustments are coarse and limited in range.

Where the OLT receiver uses a variable gain photodiode such as, for example, an Avalanche-type Photodiode (APD) then the receiver optical input range can be adjusted by controlling the APD voltage bias because the APD optical-to-electrical gain depends on the bias level. In some situations, it will be desirable to adjust the operating range of the OLT receiver during operation in order to account for optical link conditions not supported by the original receiver operating point. One example of such a situation is a system where the input power from one or more ONUs is higher than the supported range and therefore violates the receiver input overload level. In this case, the receiver operating range may be shifted upward (by decreasing APD gain) to support a higher input overload level. Another example of such a situation is a system where the input power from each ONU has decreased significantly over time, indicating a change in the ODN or receiver characteristics. In this case, the receiver operating range may be shifted downward (by increasing APD gain) to improve bit error ratio (BER) at low input levels.

To this end, facilitating photodiode input power measurement (i.e., ONU input power measurement) with an RSSI circuitry in accordance with the present invention enables accurate measurement of the input power from each ONU on a PON. Accurate measurement of input power allows the OLT to determine conditions such as whether an ONU is operating outside an allowed range or how much the power from a group of ONUs has changed over time. Thus, implementation of RSSI circuitry in accordance with the present invention in combination with suitable photodiode gain control provides for a closed-loop system that can adjust photodiode gain in response to certain PON conditions.

An advantage of such a combined implementation of such RSSI circuitry and photodiode gain control is that the OLT receiver gain is adjusted to account for measured changes in PON conditions and receiver characteristics. This enables the OLT to be configured for taking corrective action and extending the input operating range of the OLT. Additionally, these adjustments can be made with relatively fine resolution and with relatively wide range.

The voltage bias of the APD used on the OLT is controlled using a circuit that sets the operating point for a DC-DC power supply. Increasing the voltage bias has the effect of increasing the optical-to-electrical gain of the APD. Typically, an OLT uses an APD bias that provides maximum Signal-to-Noise Ratio (SNR) and only adjusts the bias to account for changes in temperature since the bias point for maximum SNR will change with temperature.

Figure 2:
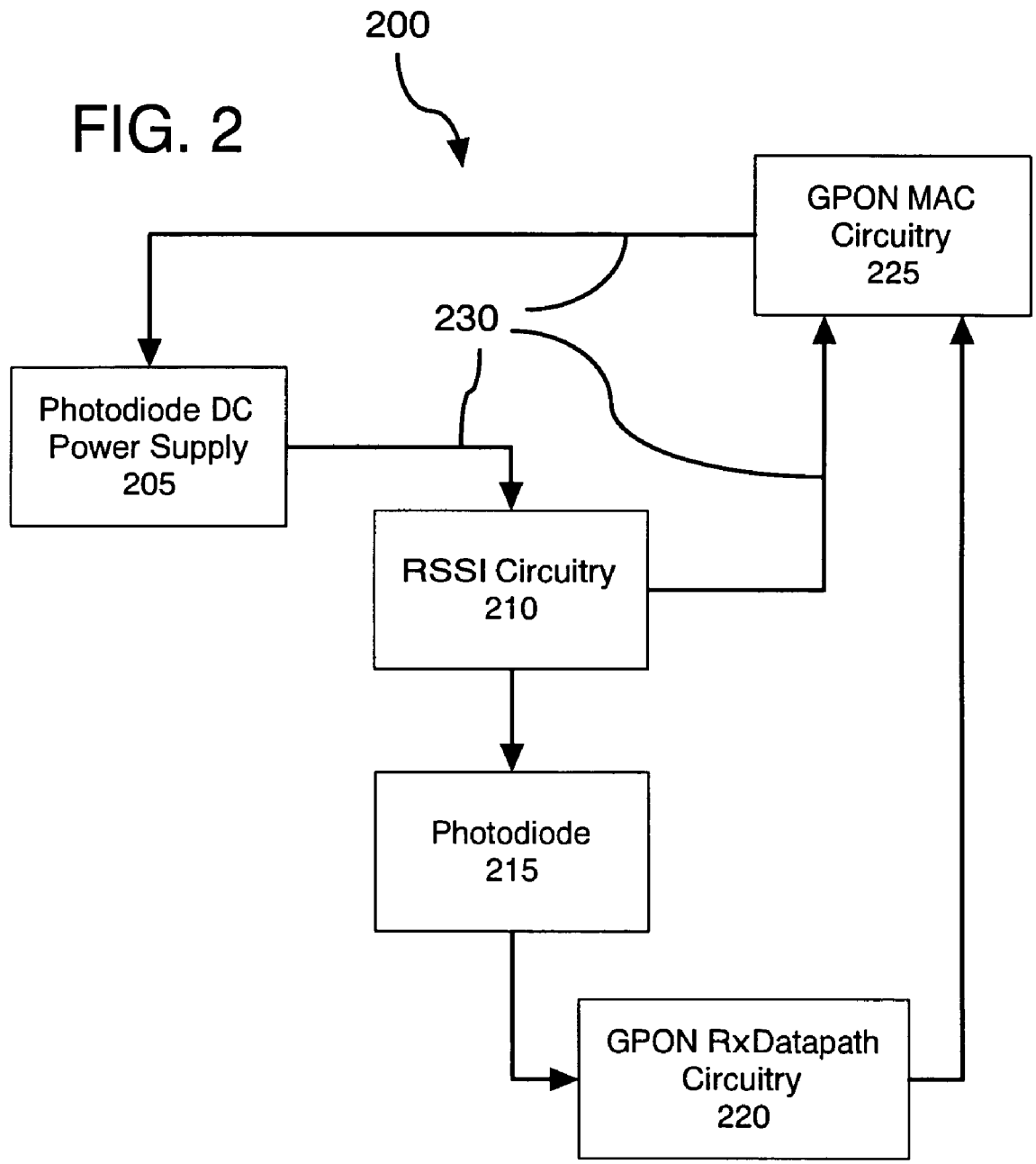
FIG. 2 depicts an embodiment of a GPON OLT configured for providing closed-loop photodiode gain control in accordance with the present invention.

Referring now to FIG. 2, an embodiment of a GPON OLT configured for providing closed-loop photodiode gain control in accordance with the present invention is depicted. The GPON OLT is referred to herein as the OLT 200. The OLT 200 includes a photodiode DC power supply 205, a RSSI circuit 210, a photodiode 215, GPON receiver datapath circuitry 220 and GPON MAC circuitry 225. The RSSI circuitry 210 is substantially the same as that depicted in FIG. 1 and is connected between the DC power supply 205, the photodiode 215 and the GPON MAC circuitry 225. Preferably, the photodiode 215 is an Avalanche-type photodiode or, optionally, a photodiode that offers suitable bias-level dependent gain.

The photodiode 215 is connected between the RSSI circuitry 210 and the GPON receiver datapath circuitry 220. A closed-loop path 230 is provided between the DC power supply 205, the RSSI circuit 210 and the GPON MAC 225. Through control of the Photodiode DC power supply 205, results of RSSI input power measurement as discussed above in reference to FIG. 1 are used to set a particular output of the Photodiode DC power supply 205 (e.g., via a control portion of the Photodiode DC power supply 205).

Figure 3:
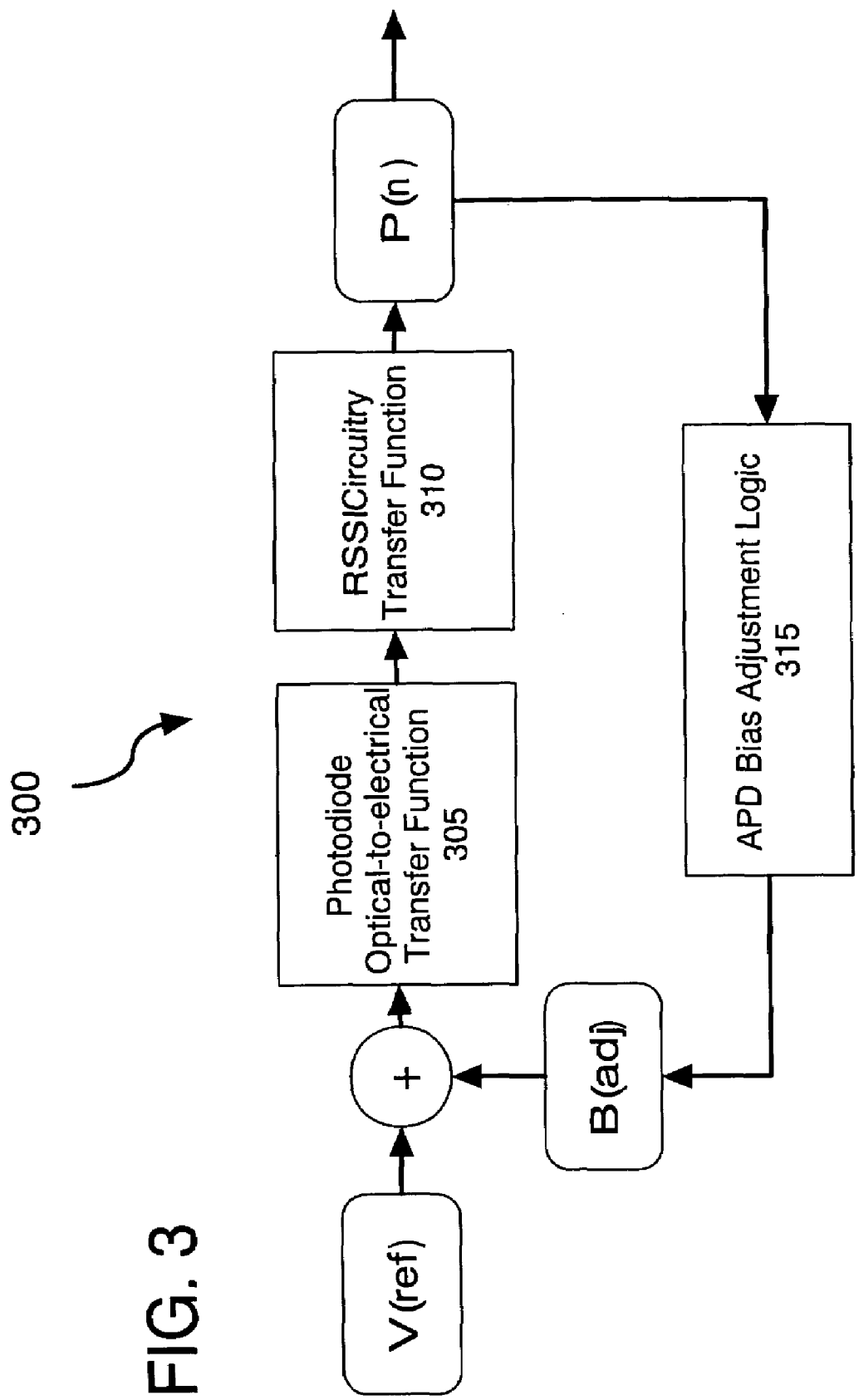
FIG. 3 depicts an embodiment of a control loop used in the OLT in FIG. 2

FIG. 3 depicts an embodiment of a control loop used in the OLT 200 in FIG. 2, which is referred to as the control loop 300. An output of a photodiode optical-to-electrical transfer function 305 is connected in series with an input of a RSSI circuitry transfer function 310. Measured optical input power levels P(n) for all ONU's of the OLT 200 are provided at an output of the RSSI circuitry transfer function 310. The measured optical input power levels P(n) are provided to an input of an photodiode bias adjustment logic 315. A photodiode bias adjustment parameter B(adj) is provided at an output of the photodiode bias adjustment logic 315. The photodiode bias adjustment parameter B(adj) is compared to a reference voltage V(ref) with the resulting voltage difference being applied at an input to the photodiode optical-to-electrical transfer function 305.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An optical line termination, comprising:
upstream data path circuitry including a photodiode;
power measurement circuitry including a logarithmic amplifier that outputs an analog voltage on a logarithmic scale dependent upon an average value of a mirror current;
a DC current load configured in a manner that maintains the logarithmic amplifier in an operating region thereof such that a response time of the power measurement circuitry remains substantially within a prescribed range of values; and
current mirror circuitry connected between said DC current load, said power measurement circuitry and said upstream data path circuitry, wherein the current mirror provides a copy of an aggregate current to said power measurement circuitry and wherein the aggregate current is a summation of a current draw by the DC current load and a current draw by the photodiode.

2. The optical line termination of claim 1 wherein the DC current load is connected in parallel with the photodiode of said upstream data path circuitry.

3. The optical line termination of claim 2 wherein the DC current load exhibits a substantially fixed load and exhibits a temperature-dependent resistive value for limiting variations in an offset current associated therewith.

4. The optical line termination of claim 1 wherein:
said power measurement circuitry includes analog amplification circuitry and analog-to-digital converting circuitry;
said analog amplification circuitry includes the logarithmic amplifier; and
said analog amplification circuitry is connected between said current mirror circuitry and said analog-to-digital converting circuitry.

5. The optical line termination of claim 4 wherein said power measurement circuitry includes:
a first analog filter connected between said current mirror circuitry and said analog amplification circuitry; and
a second analog filter connected between said analog amplification circuitry and said analog-to-digital converting circuitry.

6. The optical line termination of claim 4 wherein:
said analog amplification circuitry outputs an analog voltage dependent upon the aggregate current;

said analog-to-digital converting circuitry outputs a digital voltage dependent upon the analog voltage; and said power measurement circuitry includes a power measurement module that outputs a power level dependent upon the digital voltage.

7. The optical line termination of claim 6 wherein:

said power measurement circuitry includes a counter;

said power measurement circuitry is configured for starting the counter in response to an expected change in at least one of the analog current and the analog voltage and for initiating an analog-to-digital conversion of the analog voltage when the counter attains a prescribed number of counts.

8. A method for generating a received signal strength indication, comprising:

providing a copy of an aggregate current, wherein the aggregate current is a summation of a current draw by a DC current load and a current draw by a photodiode of upstream data path circuitry in a passive optical network;

converting the aggregate current to a digital voltage, wherein converting the aggregate current includes providing the aggregate current to a logarithmic amplifier that outputs an analog voltage on a logarithmic scale dependent upon an average value of the aggregate current and causing the current draw by the DC current load to be of a value that maintains the logarithmic amplifier in an operating region thereof such that a response time of the power measurement circuitry remains substantially within a prescribed range of values; and converting the digital voltage to a power level.

9. The method of claim 8 wherein providing the copy of the aggregate current includes providing to current mirror circuitry both the current draw by a DC current load and the current draw by the photodiode of upstream data path circuitry.

10. The method of claim 8 wherein:

converting the aggregate current to the digital voltage includes providing the aggregate current to analog amplification circuitry for generating an analog voltage dependent upon the aggregate voltage and providing the analog voltage to analog-to-digital converting circuitry for generating a digital voltage dependent upon the analog voltage;

said analog amplification circuitry includes the logarithmic amplifier and at least one analog filter connected to the logarithmic amplifier; and converting the digital voltage to the power level includes providing the digital voltage to a power measurement module for generating a power level dependent upon the digital voltage.

11. The method of claim 10 wherein said converting the analog voltage to the digital voltage includes:

starting a counter in response to energizing the photodiode; and initiating an analog-to-digital conversion of the analog voltage when the counter attains a prescribed number of counts.

12. The method of claim 11 wherein said converting the digital voltage to the power level is performed in response to completion of said converting the aggregate voltage to the digital voltage.

13. The method of claim 12 wherein providing the copy of the aggregate current includes providing to current mirror circuitry both the current draw by a DC current load and the current draw by a photodiode of upstream data path circuitry.

* * * * *